United States Patent [19]

Cells

[11] Patent Number: 5,141,562
[45] Date of Patent: Aug. 25, 1992

[54] DRIER PROMOTER COMPOSITIONS

[75] Inventor: Paul L. Cells, Cleveland, Ohio

[73] Assignee: Mooney Chemicals, Inc., Cleveland, Ohio

[21] Appl. No.: 719,317

[22] Filed: Jun. 21, 1991

[51] Int. Cl.⁵ .............................................. C09F 9/00
[52] U.S. Cl. ............................... 106/310; 106/287.19
[58] Field of Search ........................... 106/310, 287.19

[56] References Cited

U.S. PATENT DOCUMENTS

| | | | |
|---|---|---|---|
| 2,739,902 | 3/1956 | Mack et al. | 106/264 |
| 3,046,153 | 7/1962 | Unkefer et al. | 106/310 |
| 3,723,152 | 3/1973 | Alkaitis et al. | 106/310 |
| 4,171,268 | 10/1979 | Collins | 252/32.7 |
| 4,389,328 | 6/1983 | Bellettiere et al. | 106/310 |

FOREIGN PATENT DOCUMENTS 1190987  7/1985  Canada .............................. 400/1705

OTHER PUBLICATIONS

CA86(24): 172966m, Vigo et al, 1977.
CA98(8): 55748d, Karasev et al, 1982.

Primary Examiner—Theodore Morris
Assistant Examiner—David M. Brunsman
Attorney, Agent, or Firm—Renner, Otto, Boisselle & Sklar

[57] ABSTRACT

The present invention relates to a composition which comprises a zirconium salt of at least one organic carboxylic acid and an alkali metal or alkaline earth metal perborate. The compositions are useful in promoting the drying of ink compositions and particularly in printing inks used in the lithographic printing process.

13 Claims, No Drawings

DRIER PROMOTER COMPOSITIONS

FIELD OF THE INVENTION

The present invention relates to compositions of matter useful as drier promoter compositions for coating compositions. More particularly, the invention relates to water activated compositions which are useful for promoting the drying of printing inks, and, in particular, printing inks used in the lithographic printing process.

BACKGROUND OF THE INVENTION

Protective and decorative coating compositions such as paints, varnishes, printing inks and enamels contain a film-forming base and other materials such as pigments, extenders, fillers, resins, solvents, thinners, plasticizers, etc. In order to decrease the drying time of such coating compositions, it has been the practice to incorporate therein various drying compositions which have typically been metal salts of organic carboxylic acids such as manganese, lead, cobalt, calcium and iron salts of carboxylic acids such as naphthenic, oleic acid, linoleic acid, octanoic acid, etc. To be useful commercially as a drier, a metal salt should be stable for a long period on storage, and it should be essentially completely soluble in the hydrocarbon solvents or diluents ordinarily used in drier compositions as well as in drying oils. A desirable feature of a drier composition is its ability to effect an even drying throughout the thickness of the film.

In order to provide drier compositions which are capable of affecting more uniform drying of films and coatings, drying compositions comprising mixtures of transition metal salts of carboxylic acids such as cobalt octoate, manganese octoate and various metal perborates such as calcium perborate, have been utilized as curing systems for various coatings including pigmented and unpigmented varnishes including pigmented varnish-ink for lithographic use. The use of mixtures of calcium perborate, manganese octoate and cobalt octoate as a curing system for varnish inks is described in Canadian Patent 1,190,987. The Canadian patent describes methods and compositions for making sheets such as paper sheets or cards covered with superimposed layers of print, the lower of which comprises a "hidden" message which is masked from a reader unless and until an upper coating is removed such as by abrasion, scratching or erasing.

SUMMARY OF THE INVENTION

The present invention relates to a drier promoter composition which comprises a zirconium salt of at least one organic carboxylic acid and an alkali metal or alkaline earth metal perborate. The promoters are useful in ink compositions and particularly as promoters for drying printing inks used in the lithographic printing process.

DESCRIPTION OF THE PREFERRED EMBODIMENTS

The zirconium salts which are useful in the promoter compositions of the invention preferably are salts of carboxylic acids or mixtures of carboxylic acids. The preparation of zirconium salts or organic carboxylic acids is well known to those skilled in the art. At times, such salts have been referred to in the art as soaps. The salts or soaps of zirconium can be prepared as normal or basic salts or soaps by varying the amount of metal reacted with the organic carboxylic acid and by other techniques used in the art to increase the amount of metal reacted with the carboxylic acid which results in overbased products. A basic or overbased zirconium salt or soap is one that contains more than a stoichiometric amount of the metal in relation to the carboxylic acid.

The organic carboxylic acids used in the formation of the salts or soaps can be either natural or synthetic, aliphatic or aromatic acids or mixtures thereof. Examples of natural acids, although usually refined, include straight and branched chain carboxylic acids and mixtures such as tall oil acids and cyclic carboxylic acids such as naphthenic acids. A variety of synthetic carboxylic acids, and particularly aliphatic carboxylic acids or mixtures thereof are useful, and these generally contain six or more carbon atoms.

The metal salts or soaps can be prepared by fusion or precipitation methods. The soaps normally are prepared in an inert liquid medium such as a hydrocarbon oil or solvent. The organic carboxylic acids generally will have at least six carbon atoms and as many as 30 carbon atoms, but when more than one carboxylic acid is employed, carboxylic acids containing as little as two carbon atoms may be employed as one of the acids of the mixture. Examples of useful organic carboxylic acids include acetic acid, propionic acid, butyric acid, isopentanoic acid, hexanoic acid, 2-ethylbutyric acid, nonanoic acid, decanoic acid, 2-ethylhexanoic acid, isooctanoic acid, isononanoic acid, neodecanoic acid, lauric acid, palmitic acid, tall oil acids, stearic acid, oleic acid, linoleic acid, naphthenic acid, etc. Mixtures of these acids with each other or the mixtures obtained after saponification of various oils can be employed in the preparation of the zirconium soaps. The basic salts or soaps are preferred since these contain higher amounts of zirconium, and those salts and soaps containing even higher metal content, often referred to as "overbased" are particularly useful in the invention. Accordingly, zirconium salts and soaps have been prepared and are known in the art containing various amounts of zirconium ranging from, for example, about 5% zirconium to about 30% zirconium or more. Useful zirconium soaps are described in, for example, U.S. Pat. Nos. 2,739,902 and 3,046,153.

Specific examples of the zirconium salts or soaps which are useful in the compositions of the invention include zirconium naphthenate, zirconium neodecanoate, zirconium tallate, zirconium 2-ethylhexanoate, etc. Examples of zirconium salts of a mixture of acids such as salts disclosed in British Patent 1,002,103, include zirconium naphthenate acetate (10% Zr); zirconium tallate propionate (10% Zr); etc. Mineral spirits solutions of zirconium salts are available from Mooney Chemicals, Inc., Cleveland, Ohio 44113 under the general trade designations TEN-CEM, CEM-ALL, NAP-ALL, HEX-CEM, LIN-ALL and NEO-NAP. The zirconium content of these available salts ranges from about 5% to about 30%. When desired, the mineral spirits may be stripped from the salt and replaced by the desired amount of oleaginous liquid of lubricating viscosity such as a mineral oil. Alternatively, the oleaginous liquid may be added to the mineral spirits solution and the mixture heated under vacuum to remove the mineral spirits.

Promoter compositions of the present invention also contain an alkali metal or alkaline earth metal perborate. The perborates provide a source of oxygen below the surface and result in internal drying of the film even when the curable film is not exposed to air. The decomposition of the perborate to release oxygen is promoted by the cobalt and manganese driers in the film as the ink picks up water during the printing process. The zirconium present in the composition is a rheology modifier and has some effect on surface (skin) drying. Thus, the combination of the zirconium salt and the metal perborate is effective in providing desirable drying characteristics throughout the film. In one embodiment, the promoter compositions are free of metals of the first transition series such as manganese. Promoter compositions containing such transition metals, e.g., manganese perborate, are not as stable as the promoter compositions of this invention which do not contain manganese.

Among the preferred alkali metal perborates are the sodium and potassium perborates. Calcium and magnesium are preferred alkaline earth metal perborates with calcium being the most preferred of the metals.

The relative amounts of zirconium salt and metal perborate included in the compositions of the present invention may vary over a wide range. In one embodiment, the compositions may contain from about 10 to about 90% by weight of the zirconium salt and from about 10 to about 90% by weight of the metal perborate.

In another embodiment, the promoter compositions of the present invention will comprise, an inert diluent in addition to the zirconium salt and metal perborate. Although any inert diluent can be utilized, the diluent generally is an oleaginous liquid which may include natural or synthetic oils, or mixtures thereof. Natural oils include animal oils and vegetable oils (e.g., castor oil, lard oil) as well as liquid petroleum oils and solvent-treated or acid-treated mineral lubricating oils of the paraffinic, naphthenic or mixed paraffinic or naphthenic types. Such mineral oils are a preferred diluent for the drier compositions of this invention. Useful mineral oils are available from a variety of sources.

When the promoter compositions of the present invention include a diluent, the compositions generally will comprise from about 5 to about 45% by weight of the zirconium salt, from about 5 to about 45% by weight of the alkali metal or alkaline earth metal perborate, and from about 10 to about 90% by weight of the organic diluent.

The relative amount of zirconium salt and metal perborate included in the compositions of the present invention, whether an organic diluent is present or not, may be varied as desired by one skilled in the art. Generally, the amount of zirconium salt contained in the drier composition should be an amount which is sufficient to interact with (wet out) the hydrophilic salts contained in the drier composition to provide a stable slurry; increase the viscosity of the dispersion to a desired level; and contribute to the drying capabilities of the composition to the extent desired. In some embodiments, the drier compositions of the present invention may contain as little as 1 or 2% of the zirconium salt.

The compositions of the present invention may also contain other additives to provide desirable properties. For example, anhydrous boric acid may be included to interact with any atmospheric moisture which may come into contact with the drier before use. Dispersants, stabilizers and thixotropes may also be included in the drier compositions. An example of a stabilizer-dispersant is sodium tripolyphosphate, and a silica filler such as HI SIL P-600 can be included in the compositions as a thixotrope. These additional components may be included in the drier composition in an amount from about 0.1 to about 10% by weight.

The compositions of the present invention may be prepared by mixing the components in any order using an apparatus capable of reducing the particles within the dispersion to a fine particle size such as about 10 microns. For example, the composition may be prepared in a ball mill where the components are mixed to a very fine particle size of less than about 20 microns, and preferably below about 10 microns.

The following examples illustrate the promoter compositions of the present invention. Unless otherwise indicated in the examples and elsewhere in the specification and claims, all parts and percentages are by weight, temperatures are in degrees centigrade and pressures are at or near atmospheric pressure.

|  | % Wt. |
|---|---|
| Example 1 | |
| Calcium perborate monohydrate | 40 |
| Zirconium octanoate (18% zirconium) | 40 |
| Mineral oil | 20 |
| Example 2 | |
| Zirconium octoanate (24% zirconium) | 14.0 |
| Sodium perborate monohydrate | 25.5 |
| Anhydrous boric acid | 7.7 |
| Sodium tripolyphosphate | 5.4 |
| Fumed Silica | 2.0 |
| Polypropylene glycol | 1.8 |
| Mineral oil | 43.6 |

The compositions of the present invention are useful in a variety of printing inks, and, in particular, in printing inks used in the lithographic printer process. Printing inks for this purpose may include pigmented varnishes which may comprise one or more resins such as phenolic modified rosin ester, hydrocarbon resins, linseed-isophthalic alkyd resins, etc. Hydrocarbon plasticizers may be included to impart flexibility properties to the dried ink. Various drying oils such as linseed oil, tung oil, etc., may be included in the inks to adjust the consistency and tackiness of the surface. The inks also contain various drying or curing agents heavy metal-organic salts such as the manganese and/or cobalt carboxylates. Examples of such curing agents which are commonly used are manganese octanoate and cobalt octanoate. Gelling agents also may be included to adjust the consistency of the ink, and these may include reaction products derived from unsaturated fatty acids. Thickeners such as fumed silica also may be incorporated into the printing inks. Printing inks generally contain from about 15 to about 30% by weight of pigment, the choice of pigment may be depended upon the intended use of the ink, and the desired color or colors.

The amount of the promoter composition of the present invention incorporated into the printing inks also may be varied depending upon the nature of the ink and the desired rate of drying. Normally, the composition of the present invention, such as the of Example 2, will be included in the ink compositions in amounts from about 0.5 to about 10% by weight, more generally, from about 1 to about 6 or 7% by weight.

The utility and advantage of the promoter compositions of this invention is demonstrated in the following examples.

CONTROL-1

A printing ink is prepared comprising 200 parts of a red ink (No. S-1173, Multi Color); 1.5 parts of Cobalt LIN-ALL TM containing 6% cobalt (Mooney Chemicals, Inc.); 1.5 parts of Manganese LIN-ALL TM containing 6% manganese (Mooney Chemicals, Inc.); 0.6 part of methyl ethyl ketoxime and 4 parts of water.

CONTROL-2

To 25 parts of the ink of Control-1, 1.0 part of zirconium HEX-CEM TM containing 18% zirconium (Mooney Chemicals, Inc.) is added.

EXAMPLE A

To 25 parts of the ink of Control-1, 1.0 part of the promoter composition of Example 2 is added.

The drying times for the inks prepared in Example A and the two control examples are determined as follows. Scrapedowns of the compositions are prepared on an ink test pad (Leneta Form 3NT-1 or equivalent) using a scrapedown bar while applying sufficient pressure to obtain a uniformly thin film. The thin film is then covered with onionskin paper with the glazed side down. The covered scrapedown with the onionskin paper on top is placed on a glass panel in an environmental chamber which has been equilibrated to the desired temperature and humidity which are generally 77° F. and 50% relative humidity. Gardner Recorders are centered over the ink film while insuring that the rear leg holds the onionskin paper down. Weights are used to maximize the offset and to minimize its disturbance by air currents. The recorders are operated for 12 hours. The covered scrapedowns are then removed from the chamber and the onionskin paper is peeled away from the scrapedown. The start and end of the scribe on the onionskin paper is marked, and using the Gardner 12-hour template, the drying times are measured and recorded to tenths of an hour. The drying times for three inks (duplicates) are shown in the following table.

| Sample | Dry Times (hours) | Average |
| --- | --- | --- |
| Control-1 | 12+, 12+ | 12+ |
| Control-2 | 10.1, 10.6 | 10.4 |
| Example A | 0.7, 0.9 | 0.8 |

As can be seen from the above results, the use of the promoter composition of this invention (Example A) significantly reduces the drying time.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A drier promoter composition comprising a zirconium salt of at least one organic carboxylic acid containing from 6 to about 30 carbon atoms and an alkali metal perborate.

2. The composition of claim 1 wherein the organic carboxylic acid is at least one aliphatic or alicyclic monocarboxylic acid containing from about 6 to about 30 carbon atoms.

3. The composition of claim 1 wherein the organic carboxylic acids contain from about 6 to about 12 carbon atoms.

4. The composition of claim 1 which is free of metals of the first transition series.

5. The composition of claim 1 comprising about 10 to about 90% of the zirconium salt and about 10 to about 90% of the metal perborate.

6. The composition of claim 1 also containing an inert diluent.

7. The composition of claim 6 wherein the inert diluent is a mineral oil.

8. The composition of claim 1 wherein the alkali metal perborate is sodium perborate.

9. A water-activatable drier promoter composition for printing inks comprising from about 5 to about 45% by weight of a zirconium salt of at least one organic carboxylic acid containing from 6 to about 24 carbon atoms, from about 5 to about 45% by weight of an alkali metal perborate, and from about 10 to about 90% by weight of an organic diluent.

10. The composition of claim 9 wherein the metal perborate is sodium perborate.

11. The composition of claim 9 which is free of metals of the first transition series.

12. The composition of claim 9 wherein the organic carboxylic acids contain from 6 to 12 carbon atoms.

13. The composition of claim 9 wherein the organic diluent is a mineral oil.

* * * * *